United States Patent [19]

Cox et al.

[11] Patent Number: 4,789,919

[45] Date of Patent: Dec. 6, 1988

[54] ADVANCEABLE AND RETRACTABLE PLUG-ON UNIT ASSEMBLY FOR A MOTOR CONTROL CENTER

[75] Inventors: Russell Cox, Frankfort; Stephen M. Ledbetter, Lexington, both of Ky.

[73] Assignee: Square D Company, Palatine, Ill.

[21] Appl. No.: 898,474

[22] Filed: Aug. 20, 1986

[51] Int. Cl.⁴ .............................................. H02B 11/12
[52] U.S. Cl. .................................. 361/339; 200/50 A; 200/50 AA; 361/338; 361/344; 361/391
[58] Field of Search ...................... 200/50 A, 50 AA; 361/338, 339, 344, 390, 391

[56] References Cited

U.S. PATENT DOCUMENTS

| | | | |
|---|---|---|---|
| 2,121,610 | 6/1938 | Rugg et al. | 361/339 |
| 2,669,624 | 2/1954 | Ferguson | 200/50 A |
| 3,896,353 | 7/1975 | Burton et al. | 361/339 |
| 4,090,230 | 5/1978 | Fuller et al. | 361/339 |
| 4,233,643 | 11/1980 | Iverson et al. | 361/344 |

FOREIGN PATENT DOCUMENTS 0551621 1/1958 Canada ......................... 200/50 AA 0119643 9/1979 Japan ............................... 361/339

Primary Examiner—A. D. Pellinen
Assistant Examiner—Gregory D. Thompson
Attorney, Agent, or Firm—L. I. Golden; R. T. Guttman

[57] ABSTRACT

An assembly supporting a plug-on switch unit on a mounting pan pivotally supported within a unit enclosure of an electrical control center and movable between a first position in which the plug-on jaws of the switch unit are connected to respective bus bars within the motor control center and a second position in which the plug-on jaws are spaced away from the bus bars. The assembly includes a handle operator movable between a first position indicating that the switch unit is in an "OFF" condition and a second position indicating that the switch unit is in an "ON" condition. Interlock features are provided to prevent movement of the mounting pan from its first position to its second position unless the handle operator is in its first position and also to prevent removal of the unit enclosure from the motor control center unless the mounting pan is in its second position.

9 Claims, 7 Drawing Sheets

ADVANCEABLE AND RETRACTABLE PLUG-ON UNIT ASSEMBLY FOR A MOTOR CONTROL CENTER

BACKGROUND OF THE INVENTION

Field of the Invention

This invention relates generally to electrical control center equipment and, more particularly, to an assembly for mounting a plug-on electrical switch unit such as a fusible switch or a circuit breaker within an electrical control center structure.

Description of Prior Art

It is common for motor control center equipment to include a plurality of separate unit enclosures, each of which may carry one or more control units such as motor starters which are fed through fixedly mounted switch units disposed at the rear portion of the enclosure having a plug-on type connector extending from the rear of the enclosure for plug-on connection to the bus system within the control center. Generally, a plurality of independent control units of various sizes are mounted in individual unit enclosures which are vertically "stacked" within the motor control center. The unit enclosures are usually equipped with hinged doors which cover the openings in the enclosure through which the control units are accessible. Each unit enclosure is slidably mounted within the motor control center and removable from the control center to disconnect the plug-on jaw connectors of the switch units from the bus system, thereby permitting maintenance of the control units or the switch.

SUMMARY OF THE INVENTION

The present invention provides an assembly for retractably carrying a plug-on switch unit within a unit enclosure of a motor control center. The unit is pivotally mounted within the enclosure for movement between a first position in which the plug-on jaws are fully advanced for connection to the busway and a second position in which the plug-on jaws are fully retracted and clearly spaced from the busway while the unit enclosure remains in its operating position within the motor control center.

It is an object of the invention to permit maintenance of individual control units within an enclosure without slidably removing the unit enclosure from the control center.

It is a further object of the invention to prevent removal of the unit enclosure from the motor control center unless the plug-on jaws of the switch unit are fully retracted.

Another object of the invention is to interlock the cover when the switch unit is connected to the busway and the switch handle is in the "ON" position.

An additional object of the invention is to permit the plug-on jaws to be advanced only when the switch unit is in the "OFF" position.

A further object of the invention is to require that the plug-on jaws be fully retracted and the switch handle positioned in its "OFF" position before allowing slidable installation of the unit enclosure.

Other features and advantages of the invention will be apparent to those skilled in the art from the following specification including the appended claims and the accompanying drawings of the invention in which:

DESCRIPTION OF THE PREFERRED EMBODIMENT

Figure 1:
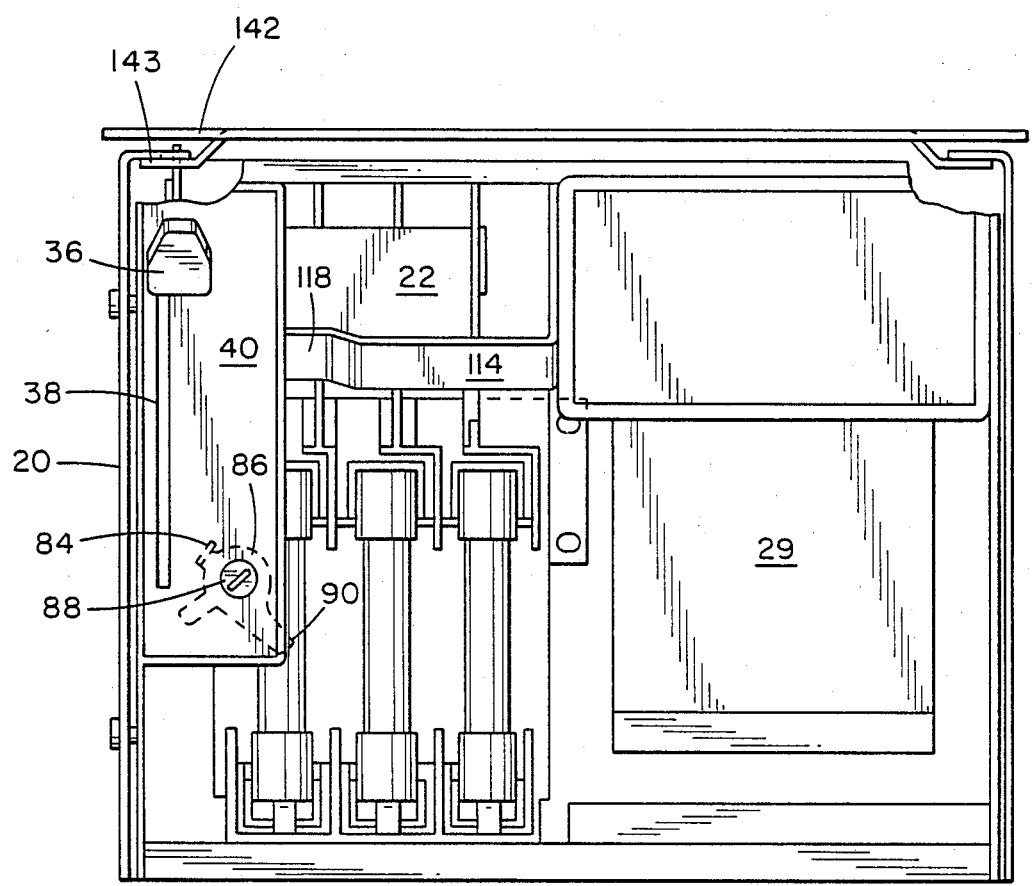
FIG. 1 is a front view of a unit enclosure showing a fusible switch mounted to the plug-on unit assembly.

A motor control center as, for example, shown by U.S. Pat. Nos. 3,482,143 and 3,495,135, each of which is assigned to the same assignee as the present invention, includes several unit enclosures 20 of the type shown in FIG. 1 and carries electrical switch units 22 which may be of the fusible switch type shown in FIG. 1 having a toggle cam 24 and a plurality of plug-on connecting jaws 26 adapted to be connected to bus bars 31 within the control center as further shown in FIG. 3. The toggle cam cooperates with a toggle spring 25 to operate the switch mechanism 27. Additional features of motor control center equipment with which the present invention may be used are shown and described in simultaneously filed application Ser. No. 898,175 for Horizontal Bus Bar Splice for Control Center, Ser. No. 898,178 for Control Center Unit Shelf Assembly and Ser. No. 898,179 for Control Unit Height Adapter, the inventors for each of which are H. W. Stanfield and R. VonRotz.

Figure 2:
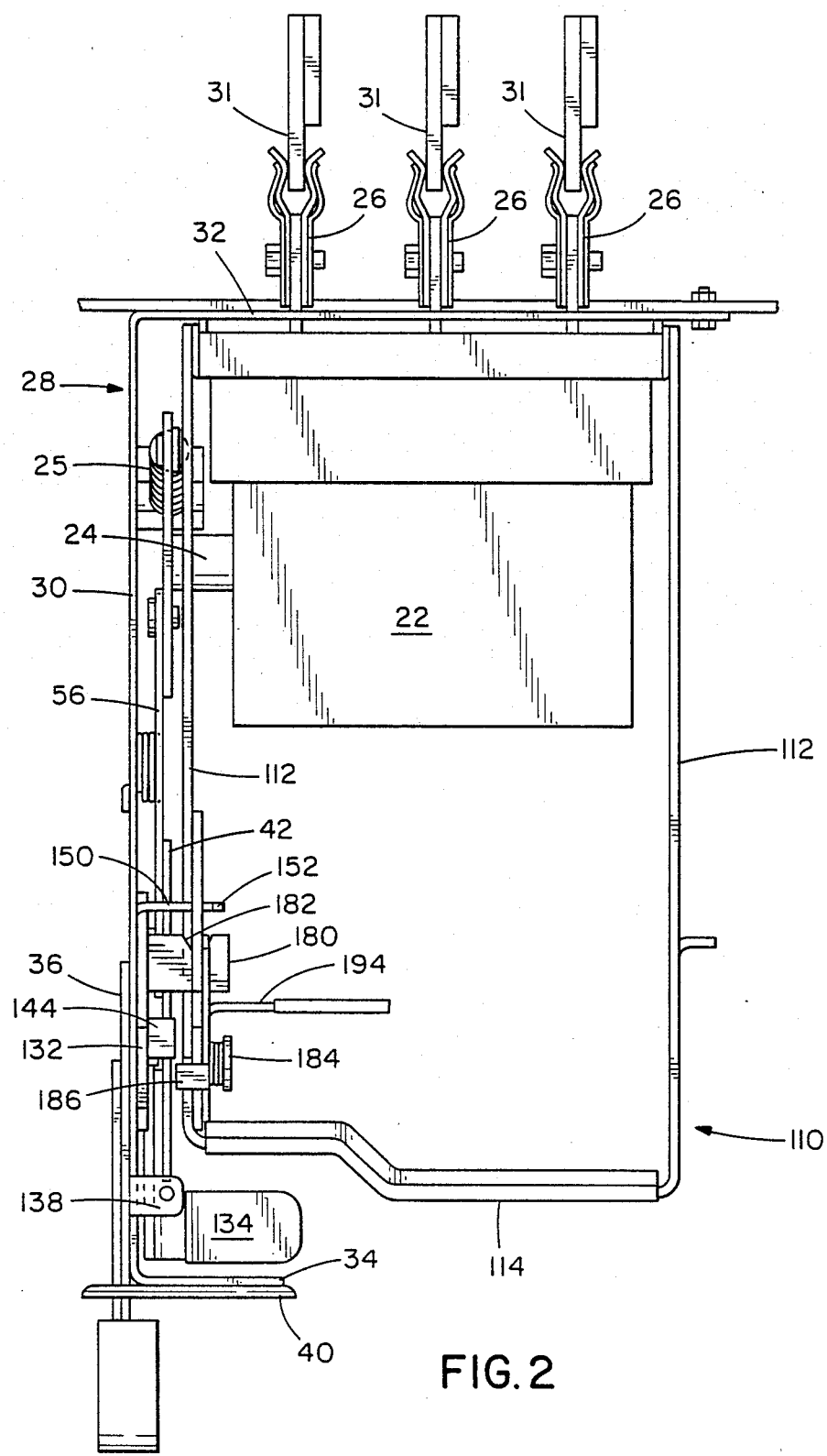
FIG. 2 is a top view of the plug-on unit assembly showing the plug-on jaws in the connected position.
Figure 4:
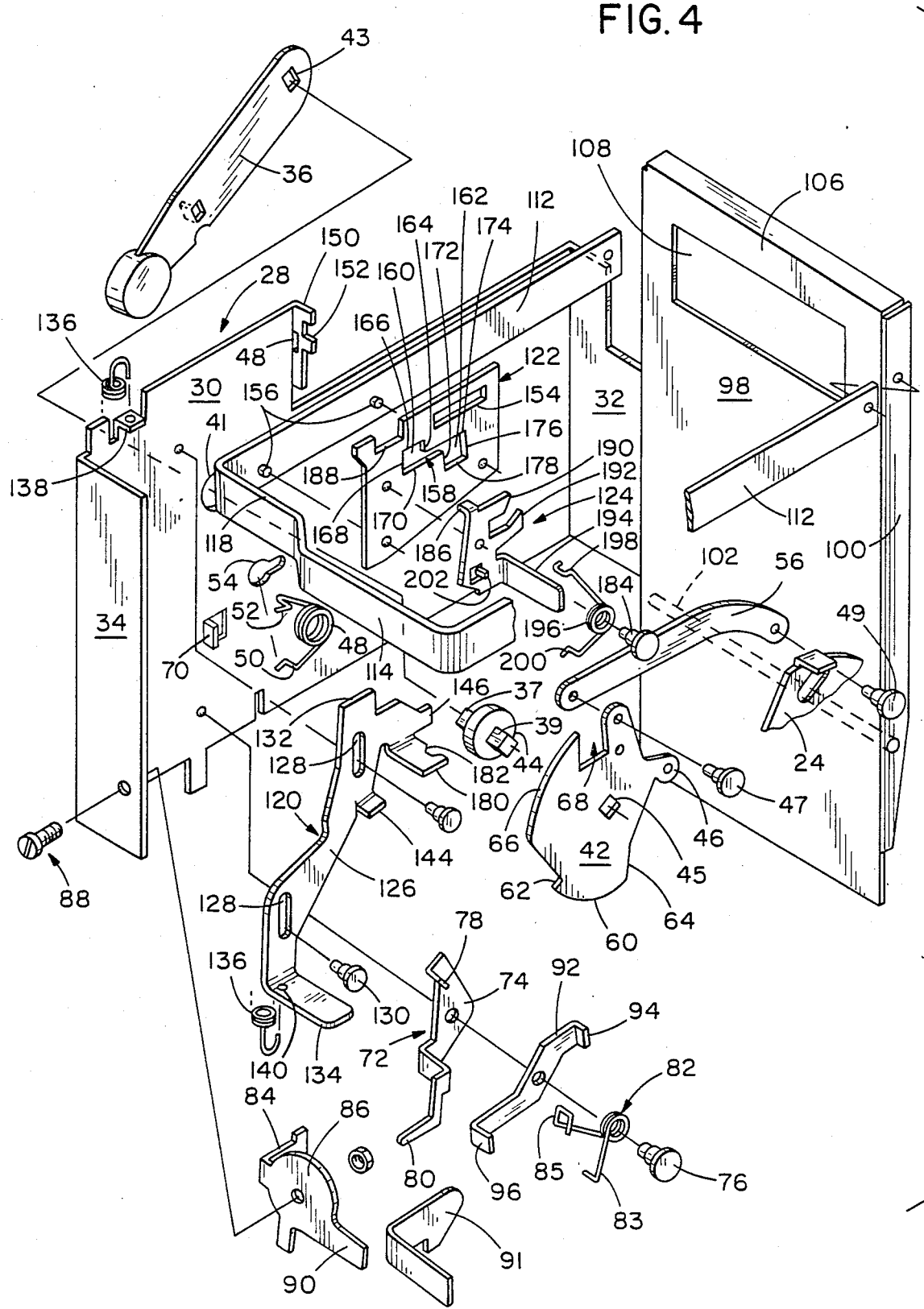
FIG. 4 is an exploded perspective view of the plug-on unit assembly.

The switch unit, of course, could also be a standard switch or circuit breaker of the type having a conventional toggle handle extending from its front face instead of having a toggle cam 24 as shown in FIG. 1 for operating the switch mechanism. Control units such as motor starters 29 are conventionally carried within the unit enclosure and fed through the switch unit. The switch units are each carried by an assembly which includes a generally L-shaped housing 28 having a side leg 30, a rear leg 32 and a front flange 34 as best seen in FIGS. 2 and 4. The housing is fastened to and spaced from the side of a unit enclosure which is slidably received in the motor control center. A handle operator 36 is rotatably connected to the housing between the housing and the unit enclosure. The handle operator extends through an elongated vertical slot 38 on a handle face plate 40 which is welded to the front flange of the housing.

The handle operator is connected to a cam operator 42 on the opposite side of the L-shaped housing.

A pivot shaft 44 having square ends 37 and 39 and a circular central portion extends through a circular opening 41 in the housing and square openings 43 and 45 respectively in the handle operator and cam operator, providing a pivot point for the handle operator and the cam operator.

Figure 3:
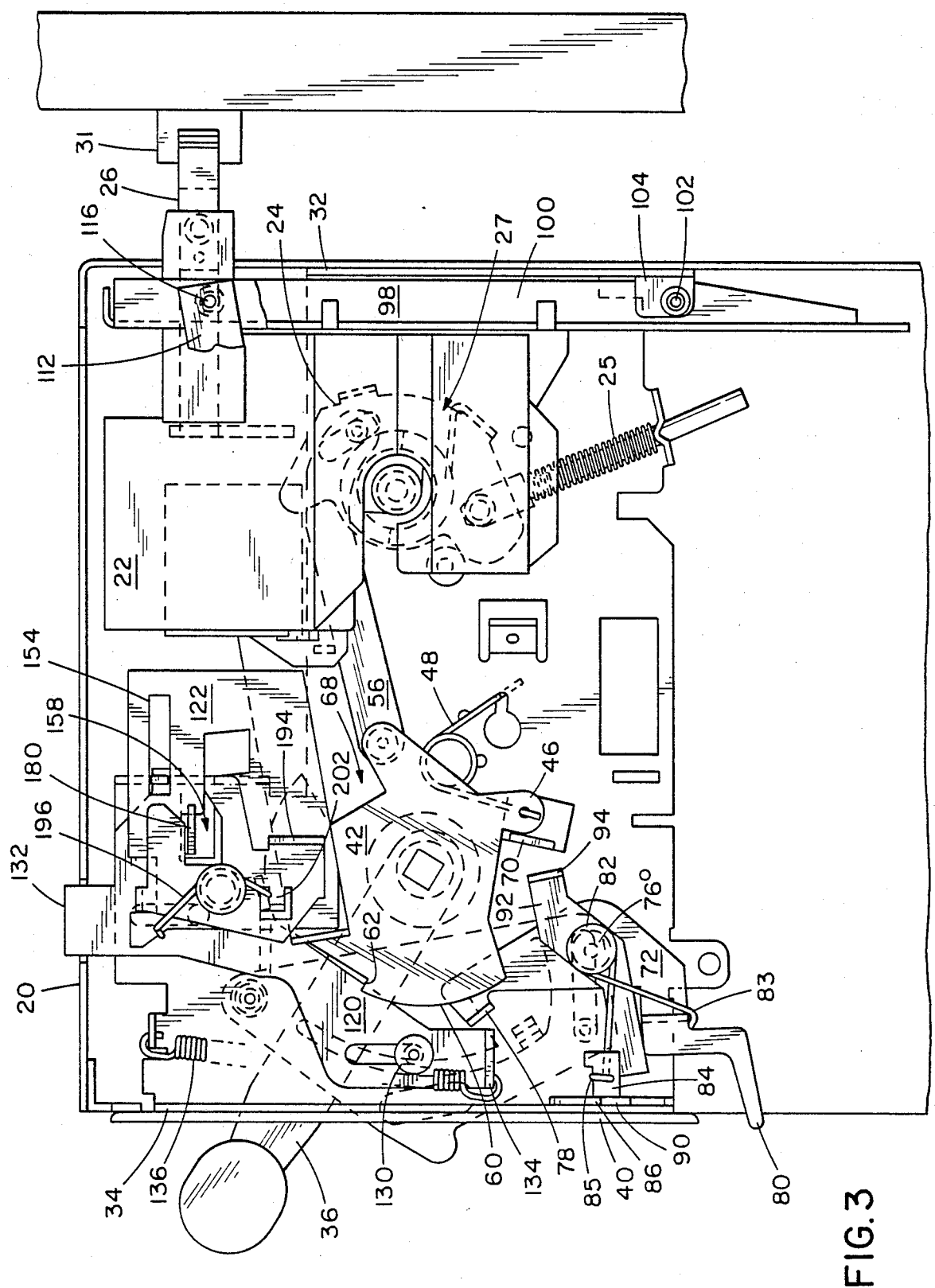
FIG. 3 is a side view of the plug-on unit within an enclosure showing the plug-on jaws in the connected position and the handle in the "ON" position.
Figure 5:
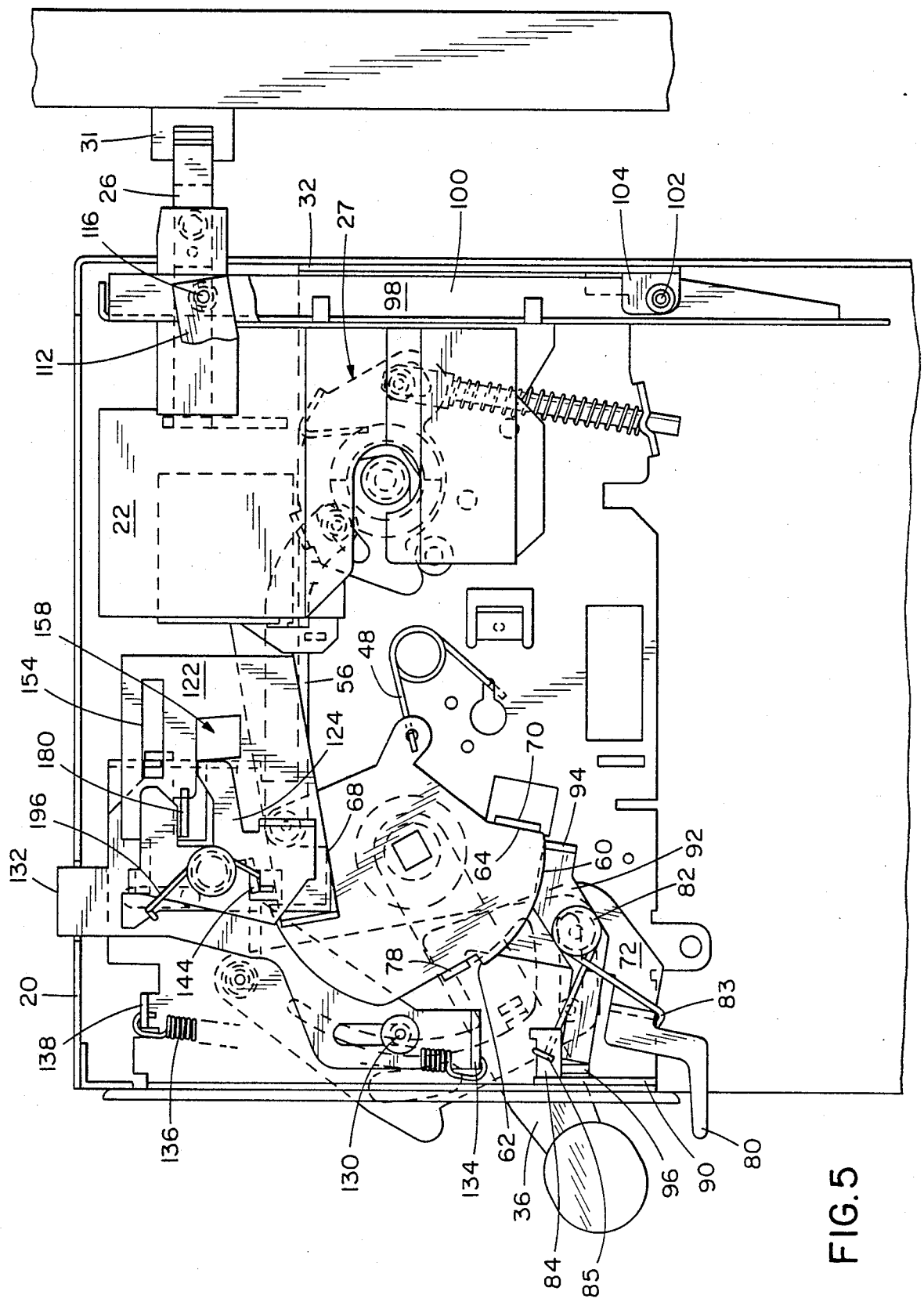
FIG. 5 is a side view as shown in FIG. 3 showing the plug-on jaws in the connected position and the handle in the "OFF" position.

The cam operator may include an arm portion 46. A spring 48, having one leg 50 engaging the arm portion and an opposite leg 52 engaging the mechanism housing through an opening 54, biases the cam operator in a counterclockwise direction as viewed from FIG. 3. A drive link 56 is connected to the cam operator and drives the toggle cam 24 to operate the switch. The handle operator is movable between a first position as shown in FIG. 5 corresponding to the switch being in an "OFF" condition and a second position as shown in FIG. 3 corresponding to the switch being in an "ON" condition. The drive link is respectively connected to the cam operator 42 and the toggle cam 24 by rivets 47 and 49.

It should be known that the assembly, when used with a circuit breaker of the type having a toggle handle extending from the front, utilizes a modified drive link, providing mechanical connection between the cam operator and the toggle handle, and does not include the spring 48 to bias the cam operator. The spring would resist movement of the handle operator to reflect a trip position of the circuit breaker.

The cam operator 42 includes a first cam surface 60 with a step portion 62 at one end and a stop surface 64 at the other end. The stop surface is intermediate the first cam surface and the arm portion 46. Both the step portion and stop surface provide reduced radial areas on opposite sides of the first cam surface.

A second cam surface 66 is provided on the cam operator with the step portion between it and the first cam surface. On the opposite side of the second cam surface is a notch channel 68 that will be further addressed hereinafter.

Figure 6:
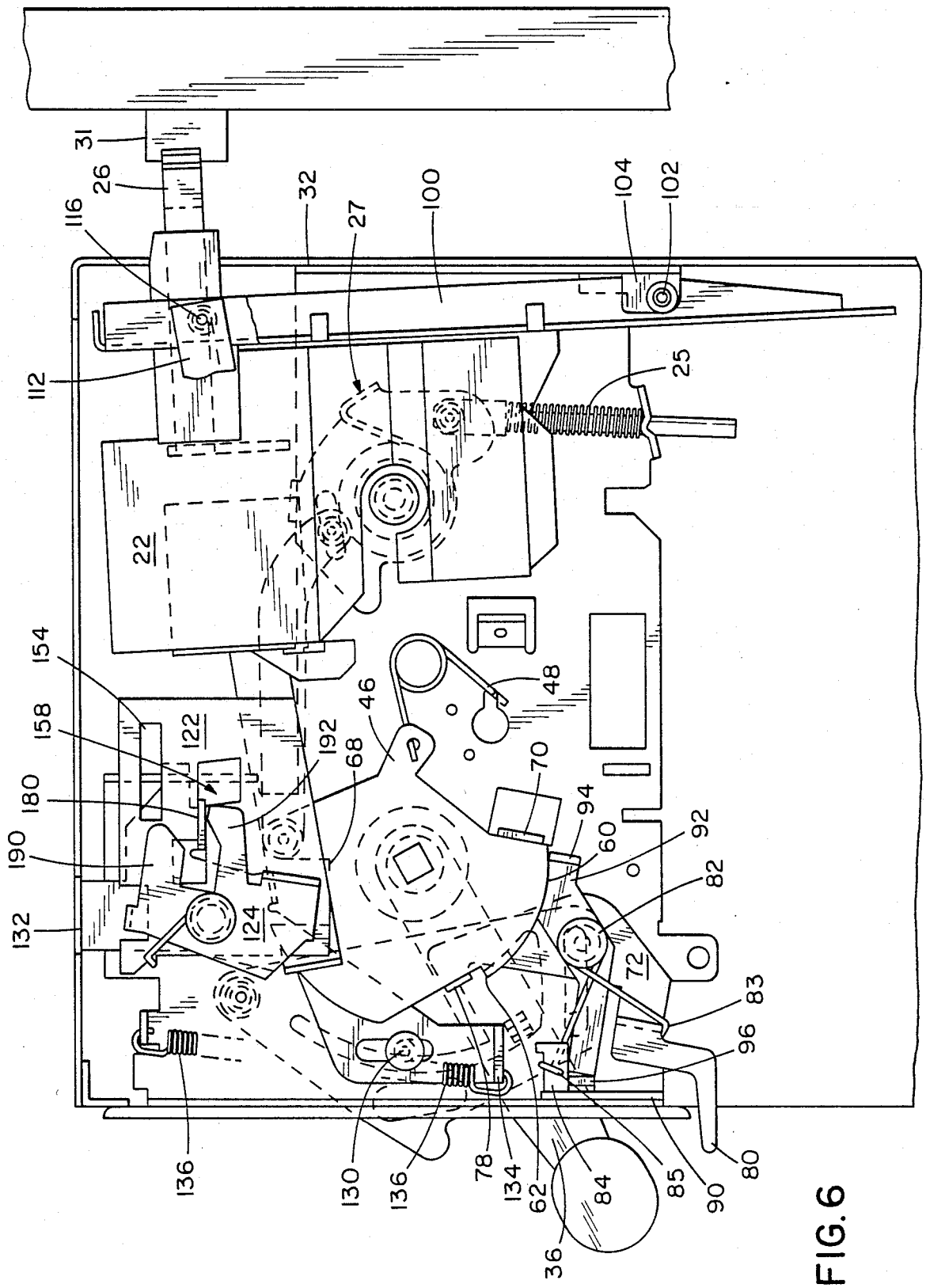
FIG. 6 is a side view as shown in FIG. 5 showing the plug-on jaws being removed from the busway.
Figure 7:
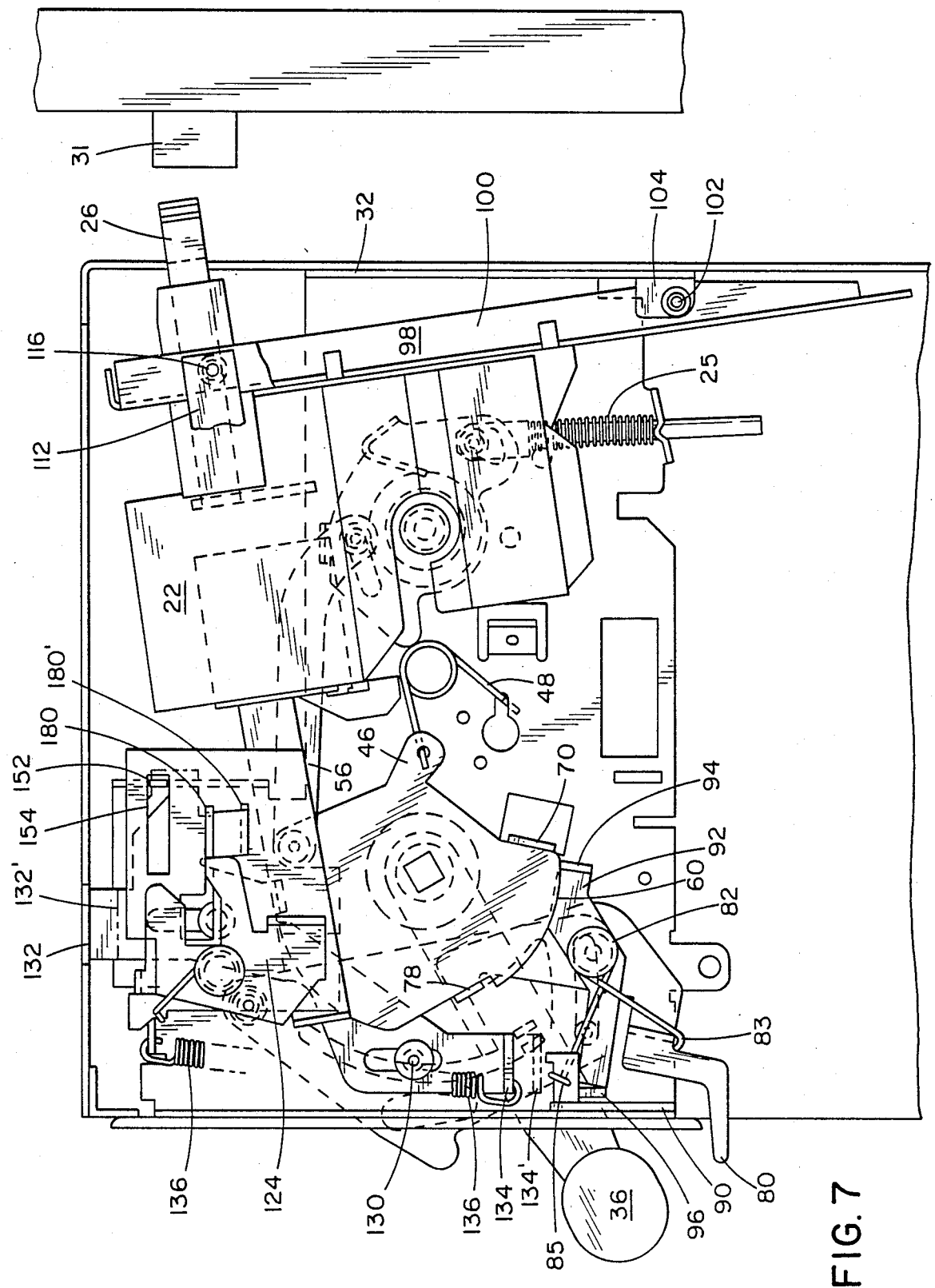
FIG. 7 is a side view as shown in FIG. 6 showing the plug-on jaws in the retracted position.

A stop ear 70 is formed by bending a section of the housing inward to provide a surface against which the stop surface of the cam operator will rest when rotated in the counterclockwise direction as seen in FIGS. 5, 6 and 7 when the handle operator is moved to the "OFF" position. It is not necessary to have the stop ear 70 if the switch unit is a circuit breaker which does not utilize the biasing spring 48 as previously addressed.

A mechanism interlock 72 includes a central portion 74 pivotally connected to the mechanism housing by a rivet 76, with one end having a lock ear 78 and the other end having an offset finger lever 80 which extends underneath and beyond the surface of the handle face plate 40.

The mechanism interlock 72 is pivotally mounted to move the lock ear 78 into a first position interfering with the step portion 62 of the cam operator as shown in FIG. 5 and a second position providing no interference with the step portion as can be seen in FIG. 3. A spring 82 biases the mechanism interlock toward the first position. The spring has one leg 83 engaged with the bottom of the mechanism interlock 72 between the central portion 74 and the finger lever 80 and an opposite leg 85 engaged with a leg 84 extending from a cover interlock 86 which is mounted to a screw 88 and is rotatable against the back side of the front flange of the housing. The spring 82 biases the cover interlock toward a first position causing an arm 90 to interfere with a hasp 91 on the enclosure door when the switch is in an "ON" position. The cover interlock 86 is movable against the bias of spring 82 to a second position as shown in FIG. 1 in which the arm does not interfere with the hasp and therefore does not lock the cover closed.

An interlock actuator 92 is also pivotally connected to the rivet 76 and permits the spring 82 to move the cover interlock to its first position when the handle operator is in its "ON" position. The interlock actuator is provided with a first ear 94 which cooperates with the first cam surface 60 and a second ear 96 engaged with the underside of the leg 84 of the cover interlock. The legs 83 and 85 of the spring 82 bias the finger lever portion 80 of the interlock 72 against the underside of interlock actuator 92 and the leg 84 against the top portion of the second ear 96 of the interlock actuator. When the first ear 94 is engaged with the first cam surface 60, in response to the handle operator assuming an "OFF" position, the interlock actuator pivots about rivet 76 to move the cover interlock 86 against the bias of spring leg 86 to its second position permitting the cover to be opened. When the handle operator is moved to its "ON" position, the first cam surface 60 is rotated out of interference with the first ear 94 of the interlock actuator, with the reduced radial portion of the cam operator 42 between the stop surface 64 and the arm portion 46 permitting the actuator to pivot about rivet 76 under the bias of spring 82, moving the cover interlock to its first position which cooperates with the hasp 91 to lock the cover closed.

As seen in FIG. 5, when the handle is in the OFF position spring 82 biases the mechansim interlock 72 to its first position with the lock ear 78 against the step portion 62 while the first cam surface 60 interferes with the first ear 94 of the interlock actuator, preventing it from moving in a counterclockwise direction as seen in that figure under the bias of spring 82 on the cover interlock leg 84.

When the finger lever 80 is manually depressed, the interlock 72 is moved against the bias of spring 82 to its second position removing lock ear 78 from its interfering position with step portion 62 of cam operator 42 and permitting movement of the handle 36 to its "ON" position as shown in FIG. 3. Movement of the handle to the "ON" position rotates the first cam surface out of interference with the first ear 94 of the interlock actuator 92 permitting the interlock actuator to rotate counterclockwise under the bias of spring 82 and simultaneously permitting the cover interlock 86 to move to its first position under the bias of spring 82 to lock the cover closed. In this condition, the lock ear 78 rests adjacent the first cam surface of the cam operator.

The cover interlock is provided with a screw defeat feature permitting manual release of the cover interlock by turning the screw 88 while the handle operator is in its "ON" position. The screw is turned clockwise as viewed from the front of the enclosure unit to overcome the bias of the spring leg 85 against leg 84 and move the interlock arm 90 clockwise, out of interference with the door hasp 91, to the position shown in FIG. 1 while the handle operator is in the "ON" position. The cover interlock 86 is fixedly connected to the screw, i.e., when the cover interlock rotates, the screw turns and when the screw turns, the cover interlock rotates.

When the handle operator is moved back to the "OFF" position, the first ear 94 of the interlock actuator is urged against the stop surface of the cam back to its position against the first cam surface which simultaneously moves the cover interlock 86 to its second position and the lock ear 78 moves along the first cam surface 60 until it returns to its first position against the step portion 62 of the cam operator.

A pan 98 having opposite side flanges 100 is pivotally mounted at its lower portion to the rear leg 32 of the mechanism housing by a pin 102 which extends through a pair of tabs 104 provided on the rear leg of the housing. Of course, connection could instead be made with the use of a pair of rivets. The association permits rotation of the upper portion of the pan 106 between a first position against the rear leg of the housing as shown in FIG. 3 and a second position spaced away from the rear leg of the housing as shown in FIG. 7.

The pan is provided with a cut out section 108 at its upper portion to facilitate extension of the plug-on jaws 26 from the circuit breaker or switch mounted on the front of the pan to the bus bars 31 running behind the pan.

A generally U-shaped handle 110 has two legs 112 and a bridge portion 114. The end of each leg is respectively connected to the top portion of the side flanges of the pan by a rivet 116 or other fastener. The bridge is provided with an offset segment 118 to facilitate ready operation of the assembly as will be hereinafter addressed.

The pan and handle assembly cooperate with a unit interlock 120, a guide plate 122 and a latch 124 as seen in FIGS. 3, 4, 5, 6 and 7 and as hereinafter described to facilitate retraction and isolation of the connecting plugs 26 of the switch from the bus bars 31 without removal of the enclosure unit 20 from the motor control center.

The unit interlock includes a main body portion 126 generally parallel to and positioned against the side leg 30 of the mechanism housing. The main body portion includes a pair of elongated slots 128, which respectively receive a pair of rivets 130 connected to the side leg of the mechanism housing, permitting limited vertical movement of the interlock between a first position wherein both rivets are positioned at the bottom end of the slot and a second position wherein the rivets are positioned at the top end of the slot.

The interlock includes a stop tab 132 at its top portion and a lever 134 extending at a right angle outward from the main body portion behind the face plate and front flange. A plastic sleeve may be placed over the lever for the comfort of an Operator attempting to press the lever to move the interlock to its second position. A coil spring 136 is connected at one end to an ear 138 on the mechanism housing and at its opposite end through a hole 140 in the lever 134 biasing the interlock to its first position which positions the stop tab at a first position extending above the side leg of the mechanism housing and in an interfering relationship with the shelf 142 which is further described in the aforereferenced application Ser. No. (PE-12), which description is hereby incorporated herein by reference. Essentially, the shelf 142 is provided with a flange 143 having an opening receiving the stop tab and preventing slidable relative movement between the unit enclosure and the shelf when the interlock is in its first position.

The interlock includes a notch ear 144 extending from the body of the interlock and aligned with the notch channel 68 in the cam operator such that the interlock can be moved from its first position to its second position only when the handle operator is in the "OFF" position.

A side tab 146 is provided on the interlock which is received in a slot 148 formed in a bend 150 of the side leg.

A guide ear 152 extends from the end of the bend and is received in an elongated slot 154 formed at the upper rearward portion of the guide plate 122. The lower portion of the guide plate is connected by a spot weld or other fastening means 156 to one leg 112 of the handle.

The guide plate is positioned in generally parallel relationship with the main body of the interlock 120 and is provided with a stepped opening 158 having a first open area 160 located toward its upper, forward portion and a second open area 162 located toward the lower rearward portion. A first block surface 164 partially defines the first open area together with a first top surface 166, a first front surface 168 and a first lower surface 170 while a second block surface 172 partially defines the second open area together with a second top surface 174, a second rearward surface 176 and a second lower surface 178.

The stepped opening receives a guide tab 180 which extends from the interlock 120 in a plane generally parallel to the plane defined by the lever 134. The guide tab is provided with a notch portion 182 which is adapted to engage the first block surface and the second rearward surface.

The latch 124 is rotatably connected to the forward side of the guide plate 122 on the opposite side from the interlock by a rivet 184. The latch includes a top ear 186 bent toward the interlock which is received within a notched segment 188 on the top portion of the guide plate. The notch is long enough to permit the latch to be rotated a predetermined distance from a first position wherein the ear is toward the rearward portion of the unit to a second position wherein the ear is toward the forward portion of the unit.

The latch further includes a mouth formed by respective extending lips 190, 192 and an operating extension 194 extending in generally parallel relation to the offset segment 118 of the handle.

A coil spring 196 is wrapped around the rivet 184 with one leg 198 formed to engage the forward surface of the guide plate and an opposite leg 200 captured by a second ear 202 formed from and extending out from the body of the latch. The spring biases the latch to its first position.

FIG. 3 is a side view showing the assembly with the plug-on jaws 26 fully connected to the bus bars 31 and the handle 36 in the "ON" position. In order to slidably remove the unti enclosure, the unit interlock must be moved from its first position in which stop tab 132 interferes with the shelf 142, preventing removal of the unit enclosure, to its second position. Pushing the lever 134 to move the unit interlock to its second position with the handle operator in the "ON" position, presumably the door interlock feature was defeated to provide access to the lever, would cause the notch ear 144 to hit the second cam surface 66. Similarly, an attempt to rotate the latch 124 by placing a thumb on the offset segment of the handle and pulling the extension 194 toward the offset segment with the index finger to retract the switch, would cause lip 190 to move guide tab 180 down until the notch ear hit the second cam surface 66. Accordingly, the handle operator must be moved to the "OFF" position to align the notch 68 with the notch ear 144 in order to permit the unit interlock to be moved from its first position, against the bias of spring 136 to its second position.

With the handle operator in the "OFF" position as shown in FIG. 5, the cover interlock is in its second position, permitting the cover or door of the enclosure to be opened without using the defeat feature. Although the notch ear 144 is aligned with the notch channel 68, guide tab 180 will be stopped by first lower surface 170 of the guide plate 122 as can be seen in FIG. 5 if the switch is not fully retracted by pivoting the mounting pan 98 to its second position as shown in FIG. 7.

With the assembly in the position as shown in FIG. 5, latch 124 can be rotated against the bias of the spring 196 by pulling the extension 194 toward offset segment 118 to move guide tab 180 against the first lower surface 170, moving the notch portion 182 of the guide tab 180 to a position clear from the first block surface 164 and permitting the handle 110 to be pulled toward an Operator and thereby pivoting the pan and jaws 26 away from the bus bars. This progression of movement is shown in FIGS. 6 and 7. At this point, the bias of spring 136 draws the guide tab 180 against the second top surface 174 on the guide plate 122. Only when the pan 98 and switch are moved to their fully retracted position, spacing the plug-on jaws clear from the bus bars 31, is the guide tab positioned within the second open area 162 of the stepped opening 158 in the guide plate, permitting an Operator to depress the lever 134 to move the guide tab to the second lower surface 178 and thereby moving the unit interlock 120 to its second position with the stop tab 132 in a non-interfering position with respect to the shelf 142, permitting the unit enclosure to be slidably withdrawn from the control center.

Similarly, the assembly must be in the same position to return the unit enclosure back to its operating position within the control center. Once the unit enclosure is returned, the Operator may advance the pan to its connected position which will return the stop tab to its lock position as shown in FIG. 5. To operate the switch, the finger lever 80 must be depressed to remove the lock ear 78 from the stop portion 62 of the operating cam.

While the invention has particularly been shown and described with reference to a preferred embodiment, it will be understood by those skilled in the art that variations in form, construction and arrangements may be made therein without departing from the spirit and scope of the invention. All such variations are intended to be covered in the appended claims.

What is claimed is:

1. An assembly supporting a plug-on unit, having a plurality of plug-on jaws, within a unit enclosure of an electrical control center having a plurality of bus bars extending along the rear portion of the control center comprising:
   a housing fixedly secured to said unit enclosure;
   a mounting pan pivotally connected to said housing, said pan including an upper portion and a lower portion, said upper portion provided with a cutout section, a pin pivotally connecting the lower portion of said pan to said housing;
   said plug-on unit fixedly mounted to said mounting pan, said plug-on jaws extending outward from said plug-on unit and through said cutout section toward said rear portion of the control center; and
   handle means connected to said upper portion of said pan for pivotally moving said mounting pan between a first position in which said plurality of plug-on jaws are respectively engaged with said plurality of said bus bars and a second position in which said plurality of plug-on jaws are spaced away from said plurality of bus bars.

2. An assembly as claimed in claim 1 wherein said pan includes a pair of side flanges, said handle means comprising a generally U-shaped handle having a pair of legs and a bridge portion, said legs respectively connected to said upper portion of a respective one of said side flanges.

3. An assembly as claimed in claim 2 including a handle operator mechanically connected to said plug-on unit and movable between a first position corresponding to said plug-on unit being in an "OFF" condition and a second position corresponding to said plug-on unit being in an "ON" condition and interlock means for preventing movement of said pan from said first position to said second position while said handle operator is in said second position.

4. An assembly supporting a switch unit having a plurality of plug-on jaws within a slidably removable unit enclosure of an electrical control center having a plurality of bus bars extending along the rear portion of the control center, said assembly comprising:
   a housing secured to said unit enclosure; said housing having a side leg and a rear leg, said rear leg including a pair of tabs;
   a mounting pan having opposite side flanges, an upper portion and a lower portion, said upper portion including portions defining a cut-out section, said switch unit mounted to said mounting pan with said plug-on jaws extending through said cut-out section, said side flanges respectively pivotally connected to said tabs, said mounting pan movable between a first position wherein said plug-on jaws are connected to said bus bars and a second position wherein said plug-on jaws are spaced from said bus bars;
   a generally U-shaped handle having opposite side legs connected to the upper portion of said mounting pan;
   a handle operator adjacent a first side of said side leg;
   a cam operator adjacent an opposite side of said side leg, said handle operator and cam operator pivotally interconnected;
   drive means for mechanically connecting said cam operator to operate said switch unit between an "ON" condition and an "OFF" condition,
   said handle operator and cam operator movable between respective first positions corresponding to said "OFF" condition and respective second positions corresponding to said "ON" condition;
   a shelf positioned above said unit enclosure, said shelf having an opening for receiving a stop tab;
   a unit interlock having a stop tab, a notch ear and a lever, said unit interlock mounted to said side leg for reciprocal movement between a first position in which said stop tab extends into said space for preventing relative movement between said unit enclosure and said shelf and a second position in which said stop tab does not extend into said space for permitting relative movement between said unit enclosure and said shelf; and
   a spring biasing said unit interlock to said first position,
   said cam operator having portions defining a notch channel which is aligned with said notch ear in response to said handle operator assuming its first position, said cam operator preventing movement of said unit interlock from said first position to said second position unless said handle operator is in said first position.

5. An assembly as claimed in claim 4, including a guide plate carried by one of said handle side legs, said unit interlock having a guide tab, said guide plate including portions defining a stepped opening receiving said guide tab, said opening permitting movement of said unit interlock from said first position to said second position provided said mounting pan is in said second position.

6. An assembly as claimed in claim 5 including a latch rotatably connected to said guide plate, said latch operably associated with said guide tab to move said guide tab within said stepped opening between a first position and a second position when said mounting pan is in said first position, said first position of said guide tab permitting movement of said mounting pan from said first position to said second position and said second position of said guide tab preventing movement of said mounting pan from said first position to said second position.

7. An assembly as claimed in claim 6 including an interlock pivotally connected to said side leg, said interlock including a finger lever portion and a lock ear, said cam operator including a step portion and a first cam surface, a spring biasing said interlock toward a first position with said lock ear against said step portion preventing movement of said cam operator in response to said handle operator assuming said first position.

8. An assembly as claimed in claim 7 wherein said interlock is movable in response to movement of said finger lever to pivot said interlock against the bias of said spring to remove said lock ear from said step portion and permit movement of said cam operator from said first position to said second position.

9. An assembly as claimed in claim 8 including a cover interlock movable between a first position in locking relationship with a cover hang and a second position in nonlocking relationship with the cover hang and actuator means for moving said cover interlock to said first position in response to said handle operator assuming said second position and moving said cover interlock to said second position in response to said handle operator assuming said first position.

* * * * *